Dec. 13, 1949     J. D. BUCHANAN     2,490,944

RECIPROCATING VALVE

Filed Jan. 8, 1946

J. D. BUCHANAN,
INVENTOR.

BY

ATTORNEY.

Patented Dec. 13, 1949

2,490,944

UNITED STATES PATENT OFFICE 2,490,944

RECIPROCATING VALVE

J. D. Buchanan, Burbank, Calif.

Application January 8, 1946, Serial No. 639,756

1 Claim. (Cl. 251—135)

The invention relates to improvements in a reciprocating valve of the poppet type.

Poppet valves usually have a valve head having a conical face which fits a conical seat. In order to accurately fit this valve to its seat it is necessary to grind the valve head to its seat, with the result that the valve heads of a number of such valves are not interchangeable, due to displacement or angularity of the axis of the seat with respect to the axis on which the valve head moves.

An object of the present invention is to avoid the necessity of grinding each valve to its seat and to provide a valve construction wherein the valve heads are interchangeable.

Other objects of the invention are to provide an improved form of valve head and seat, an improved means for operating the valve and an improved construction of cage for the valve.

For further details of the invention reference may be made to the drawings wherein Fig. 1 is a vertical sectional view of a reciprocating valve according to the present invention.

Figure 1:
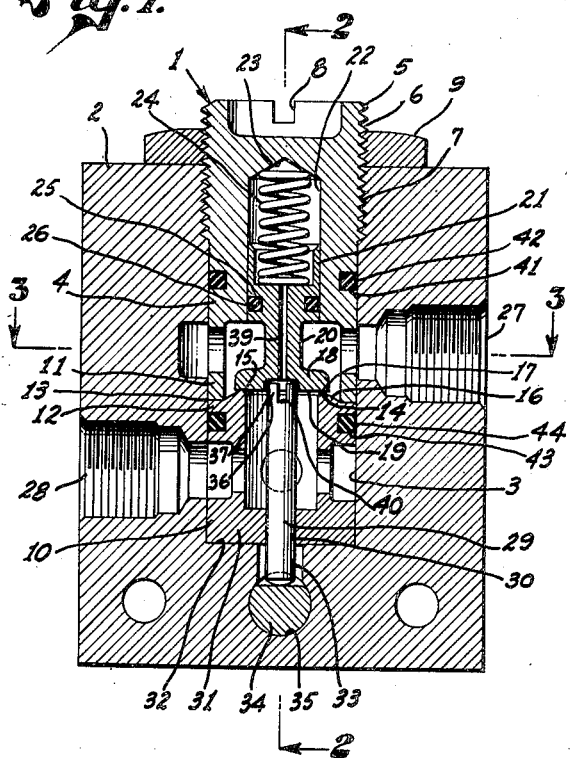
Figure 2:
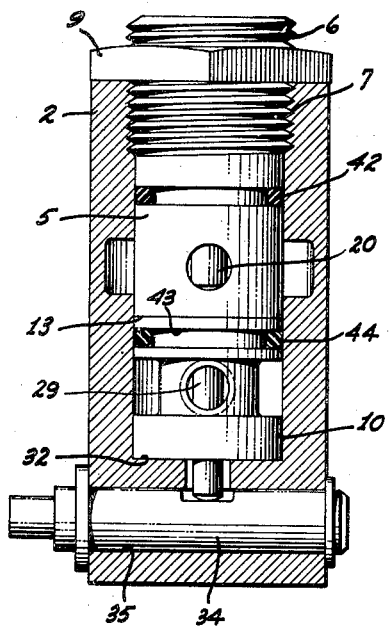
Fig. 2 is a vertical cross sectional view of the valve casing on line 2—2 looking in the direction of the arrows.
Figure 3:
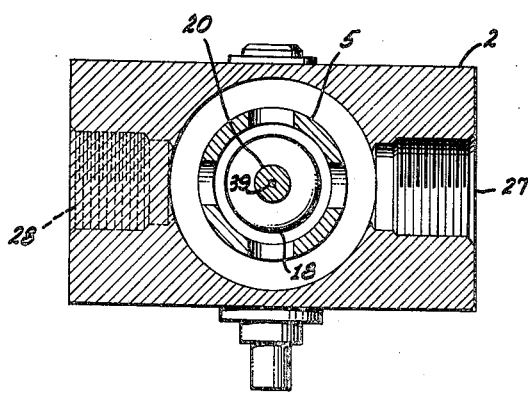
Fig. 3 is a horizontal sectional view on line 3—3 of Fig. 1 looking in the direction of the arrows.

Referring in detail to the drawings, the reciprocating valve 1 comprises a valve casing 2 having a cylindrical bore 3 in which is arranged a valve cage 4. Valve cage 4 comprises a top section 5 having at its outer end screw threads 6 having companion threads 7 in the casing 2. The top section 5 projects outside of the valve casing 2 and is provided with a kerf 8 to screw the top section in and out. The top section 5 may be provided with a lock nut 9.

The top cage section 5 retains the bottom cage section 10 in the bore 4, the inner end 11 of the top section 5 bearing on the outer end 12 of the bottom cage section 10 as indicated at 13.

Arising from the outer end of the bottom section 10 is an annular valve seat 14 in the form of a ridge having oppositely inclined conical sides 15 and 16 which merge in a summit 17. The summit 17 may be a sharp edge, or be slightly flattened in the course of lapping the seat as later described. The summit 17 extends in a plane which is substantially at right angles to the axis of the seat 14. For the seat 14 is provided a poppet type reciprocating valve 18 which terminates at its inner end in a face 19 which extends in a plane at right angles to the axis of the valve head 18.

Integral with valve head 18 is a stem 20 and also a hollow piston 21 which slidingly fits with a slight tolerance in the bore 22 in the top section 5. Bore 22 does not extend outwardly all the way through the top section 5, its outer end being closed by the wall portion 23 resulting from not drilling all the way through the cage section when drilling the bore 22. Between the end 23 of bore 22 and the piston 21 is arranged a compression spring 24 which urges the valve head 18 to its seat 14.

Piston 21 has an annular recess 25 in which is arranged an elastic ring seal 26.

The diameter of seat 14 may be slightly larger than the diameter of bore 22 whereby the pressure in inlet 27 assists in seating the valve. Leakage between the inlet 27 and the outer end of bore 22 is prevented by the sealing ring 26.

The valve head 18 has no valve stem integral therewith on its underside, the slight clearance between the piston 21 and the bore 22, also the sealing ring 25 permitting slight movement of the valve head 18 with respect to the axis of bore 22 so that the valve face 19 of the valve head 18 will adjust itself to and lie in the plane of the valve seat summit 17 when the valve is closed.

In order to unseat the valve head 18, there is provided on the underside of valve head 18, that is on the side facing the outlet 28, a push rod 29 slidably mounted in a bore 30 substantially coaxial with the axis of lower cage section 10, bore 30 being arranged in the inner end wall 31 which rests on and is supported by the shoulder 32 forming the inner end of the casing bore 3. The push rod 29 projects beyond the inner end 31 of the bottom cage section as indicated at 33 and it is actuated by a cam 34 rotatably mounted in a transverse bore 35 in the valve casing 2.

The upper end 36 of the push rod 29 loosely fits in a socket 37 on the underside of valve head 18, the length of the upper end 36 which fits in socket 37 being greater than the distance push rod 29 is moved by cam 34, whereby the upper end 36 of the push rod always remains within socket 37 in position to properly operate the valve.

In order to relieve the pressure behind the piston 21, it and valve head 18 are provided with an axial relief passage 39 which opens at its outer end behind piston 21 and which opens at its inner end on the underside of valve head 18 at the socket 37. A cooperating relief passage 40 is provided at the upper end 36 of the push rod 29, the passage 40 comprising a diametrical cross cut extending all the way across and through the upper end of the push rod 29. The cross cut 40 opens into the upper end of push rod 29 and communicates with the inner end of relief passage 39, regardless of whatever rotated position push rod 29 may have about its axis. Also, the cross cut 40 extends inwardly in an axial direction along the push rod 29 for a distance greater than the depth of socket 37 whereby the opposite ends of cross cut 40 are always in communication with the outlet 28.

The top cage section 5 between the inlet 27 and the screw threads 6 and 7 is provided with a peripheral recess 41 in which is arranged an elastic ring seal 42 to prevent leakage between the inlet 27 and the outer end of the casing bore 3.

Between the seat 17 and the outlet 28 the bottom cage section 10 is provided with a peripheral recess 43 in which is arranged an elastic ring seal 44 to prevent leakage around the outside of the bottom cage section 10.

It will be seen therefore, that a simple cage construction is provided in that the cage has only two cage sections 5 and 10, one cage section holding the other one in place, each cage section carrying its own seal 42 and 44.

To reduce the time and expense of fitting the valve heads to their seats and to provide a valve head and seat construction wherein any one of a number of valve heads will fit accurately any one of a number of seats without making it necessary to individually grind each valve to its seat, a plurality of valve heads like head 18 may have their planary faces like 19 turned up in a lathe or the like in such manner that the face 19 has a large tolerance with respect to being in a plane at right angles to the axis of the valve head. A plurality of such valve heads are arranged in a jig with the valve faces 19 lying substantially in a common plane, but with a large tolerance. Then a lapping disk and suitable abrasive are employed to lap all of the plurality of valve faces in one operation, so that they lie in a common plane.

Likewise a plurality of the bottom cage sections 10 are arranged in a jig with the summits 17 being substantially a sharp edge formed by the intersection of the oppositely inclined conical sides 15 and 16, the summit or edge 17 lying in a plane which is at right angles to the axis of the bottom cage section 10 but with a large tolerance. A plurality of such bottom sections 10 are arranged in a jig with the seats or summits 17 arranged substantially in a common plane and they are lapped in one operation to lie exactly in a common plane, as above described. The valve heads and seats thus made are paired and assembled in a valve casing as above described, and such pairing may be done indiscriminately as all valve head faces are planary and all valve seats are planary. Hence the valve heads are interchangeable and each valve head will accurately fit all of the seats, provided, of course, that the valve head is mounted for movement in such a manner as to permit it to adjust itself to the seat, and such means has been heretofore described.

In the initial stage of making the bottom cage section 10, the seat 17 is machined to a sharp edge and while it is desirable for the seat to have this sharp edge, it is flattened as little as possible in the lapping operation, and only to the extent necessary to lap all of the seats to lie in a common plane as above described.

The valve head 18 and seat 14 may be made of steel or other hard metal while the other parts above described, except, of course, for the ring seals, may be made of dural or other suitable material.

Various modifications may be made in the invention without departing from the spirit of the following claim.

I claim:

A valve comprising a casing having a bore with inlet and outlet passages therefor, a two piece valve cage having top and bottom sections fitting said bore, companion threads on said casing and on the outer end of said top section, the inner end of said top section bearing on the outer end of said bottom section, a valve seat on the outer end of said bottom section, a poppet valve head for cooperation with said seat, said valve head having a stem only on its outer end, said stem comprising a piston integral with said valve head, a peripheral recess in said piston, a ring seal in said recess, said top section having a bore closed at its outer end and slidably supporting said piston, a peripheral recess in said top section and a ring seal therein between said inlet and the outer end of said casing bore, a peripheral recess in said bottom section and a ring seal therein between the outer end of said bottom section and said outlet, an axial relief passage in said piston and valve head, and a push rod disconnected from and engageable with the underside of said valve head, the outer end of said push rod having a cooperating relief passage communicating with said outlet and with said first mentioned relief passage.

J. D. BUCHANAN.

REFERENCES CITED

The following references are of record in the file of this patent:

UNITED STATES PATENTS

| Number | Name | Date |
|---|---|---|
| Re. 22,552 | Ellinwood | Oct. 3, 1944 |
| 1,406,869 | Jester | Feb. 14, 1922 |
| 2,011,007 | May | Aug. 13, 1935 |
| 2,034,829 | O'Malley | Mar. 24, 1936 |
| 2,075,600 | Baker | Mar. 30, 1937 |
| 2,294,702 | VanDerWerff | Sept. 1, 1942 |
| 2,337,659 | Hughey | Dec. 28, 1943 |
| 2,368,212 | Grant, Jr. | Jan. 30, 1945 |
| 2,376,322 | Benaway | May 22, 1945 |